Figure 1:
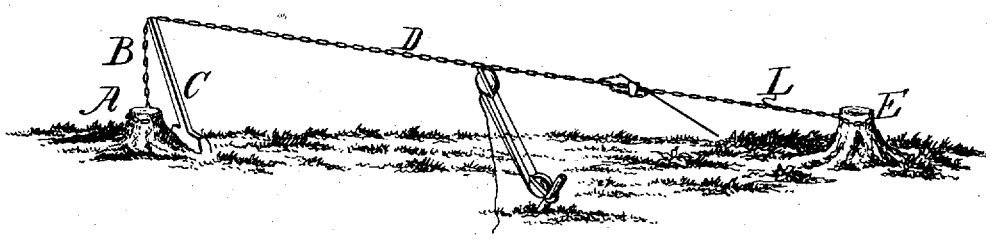
Figure 2:
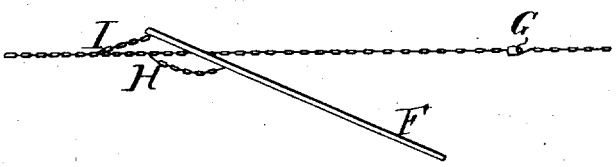

6509X

W. Foster,

Stump Elevator.

Patented Apr. 22, 1831.

AM. PHOTO-LITHO. CO. N.Y. (OSBORNE'S PROCESS)

6509X Apl 22, 1831

Willard Foster. Owego. New-York.

Letters Patent.

The Schedule referred to in these Letters Patent and making part of the same, containing a description in the words of the said William Foster himself, of his improvement in the application of power in extracting stumps.

To all to whom these presents shall come.

Be it known that I, Willard Foster, of Owego in the County of Tioga and State of New York, have invented a new and useful improvement for extracting stumps, and that the following is a full and exact description of the construction and operation of the said Machine as invented by me as appears by the drawing of the same herewith sent, to which reference is had.

Figure 3:
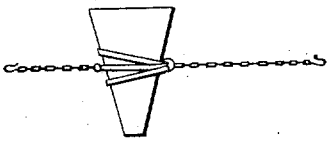

A chain B with a ring or hooks at the end is to be made fast to the stump A and passes over the end of the post or lever C to the stump or other firm hold marked E. The lever C is about nine feet long having a cap piece or foot to prevent the end from sinking into the earth; this lever is to be placed in an oblique or inclined position the foot about two feet from the stump to be extracted and upper end immediately over the top of the stump. The power is applied by shortening the part of the chain marked D either by means of a block and pulleys made fast to said chain at or near its middle and drawing laterally or by the application of the invention as seen fig 3. F is a lever about sixteen feet long having a chain strongly fastened with a nut and screw or otherwise about six inches from the end of the lever and terminating with a ring as seen at G, two other chains terminating in hooks are also fastened in the same manner one at the end of the lever the other distant about twelve inches; this part of the machinery is applied by fastening the ring G to a hook 56 6509x Apl 22, 1831 hook on the chain D. as seen at L, the lever F. is laid par
allel or nearly so with the chain D. and the chain having
the hook I is drawn as far towards G as can be and made
fast to the chain D the end of the lever is then carried forward
toward the stump A which shortens the chain D and enables
the operator to hook the chain H in advance of I; the end of
the lever is then carried back and the other hook made fast,
and so alternately until the chain is drawn tight as pos=
sible by this means, or the stump A is extracted; the lever F.
may be worked either by hand, horse power, pulleys or
otherwise as may be deemed best calculated to effect the
object. after the chain has been made as tight by this means as
possible, or the stump started, a lateral draft on the chain
by means of a block and pulleys, is to be made either with
horses, cattle, or by hand or otherwise. One other part of
the invention consists in having a chain containing hooks
at the end with three long links or bands connected together
by a wedge of iron or other hard material, which is to be ap=
plied to the chain D. immediately above or beneath where
the lever F is applied the long links slip or pass by each other
and the wedge on the slacking of the chain is pushed for=
ward until the chain is again made tense— this part of
the Machinery is seen at fig 3— The power may be applied
to extracting stumps, raising weights, drawing up vessels
moving buildings or other ponderous bodies— and such
part of the Machinery or the whole applied as will be suf=
ficient to effect the object.

Witnesses — Willard Foster
Geo. Park
Christr. Patterson

Recd. 1156 — (672 Words)